United States Patent [19]

Udren

[11] Patent Number: 4,475,209
[45] Date of Patent: Oct. 2, 1984

[54] REGENERATOR FOR AN INTRABUNDLE POWER-LINE COMMUNICATION SYSTEM

[75] Inventor: Eric A. Udren, Monroeville, Pa.

[73] Assignee: Westinghouse Electric Corp., Pittsburgh, Pa.

[21] Appl. No.: 371,090

[22] Filed: Apr. 23, 1982

[51] Int. Cl.³ .............................................. H04B 3/56
[52] U.S. Cl. ...................................... 375/4; 179/170 J; 340/310 R; 375/36; 455/14
[58] Field of Search ...................... 340/310 R, 310 A; 375/3, 4, 36; 455/14–16; 179/170 J; 178/70 R, 70 TS

[56] References Cited

U.S. PATENT DOCUMENTS

| | | | |
|---|---|---|---|
| 4,007,329 | 2/1977 | McClain et al. | 375/4 |
| 4,057,793 | 11/1977 | Johnson et al. | 340/310 R |
| 4,065,763 | 12/1977 | Whyte et al. | 340/310 R |
| 4,210,901 | 7/1980 | Whyte et al. | 340/310 R |
| 4,283,693 | 8/1981 | Saenz | 455/239 |

Primary Examiner—Marc E. Bookbinder
Attorney, Agent, or Firm—D. R. Lackey

[57] ABSTRACT

A regenerator for providing detection, remodulation, and retransmission of a digital data signal propagated in the differential mode over a pair of bundle conductors of a power line. The electric power signal, propagated in the common mode over the same bundle conductors, is conducted through the regenerator and provides a power supply voltage for the regenerator electronics. A series of electrical traps prevent the electric power signal from being conducted into that portion of the regenerator utilized for processing of the data signal. The regenerator also includes bypass switches for bypassing the regenerator electronics when a power supply voltage sufficient to operate the electronics is unavailable.

19 Claims, 2 Drawing Figures

REGENERATOR FOR AN INTRABUNDLE POWER-LINE COMMUNICATION SYSTEM

BACKGROUND OF THE INVENTION

1. Field of the Invention

This invention relates generally to signal regenerators, and more specifically to such regenerators for a power-line communication system employing a power transmission line, having multiple conductors for each phase, as the signal propagation medium.

2. Description of the Prior Art

To provide centralized control and monitoring of a utility's power generation and distribution network a central computer communicates with remote terminals at each generating and switching station. At one time, power-line carrier systems were commonly used as communication channels for such power system control. Such communication systems transmit a long-wave modulated carrier signal over the three phase conductors of a power transmission line from one power substation to the next. The communication system includes a transmitter, a receiver, and associated coupling and impedance matching networks, connected at each terminal of the transmission line.

The transmitters operate at a carrier frequency in the range of 30 kHz to 300 kHz. Frequencies below 30 kHz are unusable due to the difficulty of building equipment to operate below this limit. Also, there is a substantial increase in received noise power below this limit. Frequencies greater than 300 kHz suffer substantial signal attenuation on the transmission line and increased radiation of the carrier signal, thereby possibly interfering with lone-wave radio services.

The primary source of noise at the carrier receiver is high-voltage corona on the energized transmission line. Transmitted-power levels, established according to attenuation of the line and level of corona noise at the receiver, are typically in the range of 1 to 10 watts. Thermal noise, which affects telephone or radio communication systems, is much smaller than corona noise and may be disregarded when calculating the performance of a power-line carrier channel.

Simple modulation schemes, i.e., on-off keying or frequency-shift keying are generally employed. Each modulated carrier signal typically occupies approximately 3 kHz of the frequency spectrum thus permitting, in theory, the multiplexing of approximately 90 individual modulated-carrier signals in the 30 kHz to 300 kHz band. Practical problems of adjacent channel interference, however, usually limit the number of signals to much fewer than 90 on any single power line.

Use of power-line carrier systems for power-system control has decreased in recent years. While they remain the simplest, least expensive, and most reliable of communication media available to the utility industry, the heavy use of power-line carrier for protective relaying communication and consequent congestion of the carrier spectrum have pushed utilities towards expensive microwave and telephone channels for system control and computer communication. The attractiveness of power-line carrier for data transmission in present-day circumstances would thus be greatly enhanced by devices which increase the number of available channels, and reduce interference among like channels on adjacent or parallel transmission lines. The present invention provides a device for attaining these objectives.

Although many power transmission lines comprise a single wire conductor for each phase, transmission lines operating at voltages above 230 kV use a bundle of spaced conductors to carry each phase current. A typical bundle consists of two or four conductors bundled together with conductive spacers to provide lower reactance and skin-effect losses than a single wire of the same total cross-sectional area. For power transmission, the bundled conductors in each phase are energized in the common mode.

In recent years the concept of using the bundled conductors of one phase in the differential mode for power-line carrier communication has evolved. For signal communication, a moderate level of insulation is placed between the conductors of each bundle, and a differential-mode communication signal is coupled to two conductors within the bundle, while continuing to use all conductors of the bundle in the common mode for electric power transmission. This scheme requires the use of split coupling capacitors, rated at the power-line voltage, to couple the carrier signal to and from the transmission line, and more costly insulating bundle spacers, in lieu of conducting spacers. Compared to conventional interphase signal propagation this intrabundle communication technique offers the advantages of increased bandwidth in each signal link and triplication of the number of available signal links, since each phase can be used as an independent channel. Also there is a virtual elimination of interference between channels on different phases of the same transmission line and between channels on adjacent transmission lines, and between the communication signal and radio services in the same frequency band. However, with intrabundle communication the signal attenuation increases noticeably on long lines and during foul weather, especially icing conditions. Therefore, it may be necessary to transmit a signal with an impractically high power level or to use one or more repeaters along the transmission line.

Repeaters and regenerators are frequently used in many types of long-distance communication systems to overcome signal degradation caused by noise and signal attenuation. Repeaters are used with analog modulation schemes; regenerators can be used only with baseband digital signals and pulse-code modulated signals.

In analog modulation a continuously varying carrier wave is modulated by a message signal. The modulated carrier assumes a wide range of values corresponding to the message signal. When the modulated carrier is adulterated by noise, a receiver cannot discern the exact value of the message at the time the interference occurred. To obtain adequate received signal strength, long-distance communication systems employing analog modulation, both free-space and cable, often use repeaters between terminals. These repeaters are well known in the art. With analog modulation, a repeater can do nothing more than simply amplify both the modulated carrier signal and the noise. Additional noise can also be introduced by the amplification process, causing the signal-to-noise ratio to progressively deteriorate at each repeater station.

With a pulse-code modulated signal or a baseband digital signal, the transmitted signal can have only a limited number of discrete signal values. If the amplitude or phase separation between these signal values is large compared to the noise perturbations, the receiver can determine the signal value despite noise interruptions, and accurately demodulate (or detect for baseband signals) the transmitted signal. Relying on this principle, a regenerator can therefore be utilized to demodulate (or detect), amplify, remodulate, and retransmit the signal, thereby producing a new signal free from noise (with the exception of detection errors arising during detection of the baseband signal). Like repeaters, regenerators are placed at critical locations along the transmission path. Use of a regenerator obviously prevents accumulation of noise interference and improves overall system performance.

As applied to communication systems operating on power transmission lines, prior art techniques teach the insertion of a repeater or regenerator in the signal path by decoupling the signal from the power line, processing the signal, and recoupling it to the power line for continued transmission. Such repeater or regenerator drops are expensive due to the cost of coupling capacitors rated at the power-line voltage and other power-line hardware.

Use of a prior art repeater or regenerator with the intrabundle communication scheme requires that the signal entering the repeater (or regenerator) be coupled from the high-voltage power line to the repeater input which is near ground potential. The amplified or regenerated signal must then be coupled back to the high-voltage power line. This requires two sets of costly split coupling capacitors rated for line voltage (i.e., one set at the repeater or regenerator input terminal and a second set at the output terminal). The present invention, a regenerator physically suspended from a power-line insulator and maintained at line potential, overcomes this expense. Also, during line deenergization the prior art repeaters and regenerators continue to operate. However, since line deenergization ends corona noise and the signal degradation it causes, it is unnecessary for the repeater or regenerator to continue operating under this condition. The present invention, therefore, incorporates a unique bypass arrangement whereby the regenerator is bypassed during line deenergization. These and other advantages of the present invention are discussed in detail below in the description of the preferred embodiment.

SUMMARY OF THE INVENTION

A regenerator for use with an intrabundle power-line communication scheme is disclosed. In the intrabundle communication scheme, a data signal is propagated over the power-line conductors in the differential mode, while an electric power signal is propagated over the conductors in the common mode. The regenerator, suspended directly from a power-line insulator and maintained at line potential, is coupled to the power line such that it receives only the differential-mode data signal. The data signal is detected within the regenerator and retransmitted along the power line. Novel differential-mode electrical traps, in conjunction with coupling devices, are used to insure that the regenerator receives and retransmits the data signal, while allowing uninterrupted propagation of the electric power signal. Operating power for the regenerator is obtained with a current transformer inserted in the power line. The disclosed regenerator is a practical adjunct to intrabundle communication techniques for insuring high quality data communication over lengthy power lines operating under the most adverse conditions.

DESCRIPTION OF THE PREFERRED EMBODIMENT

Figure 1:
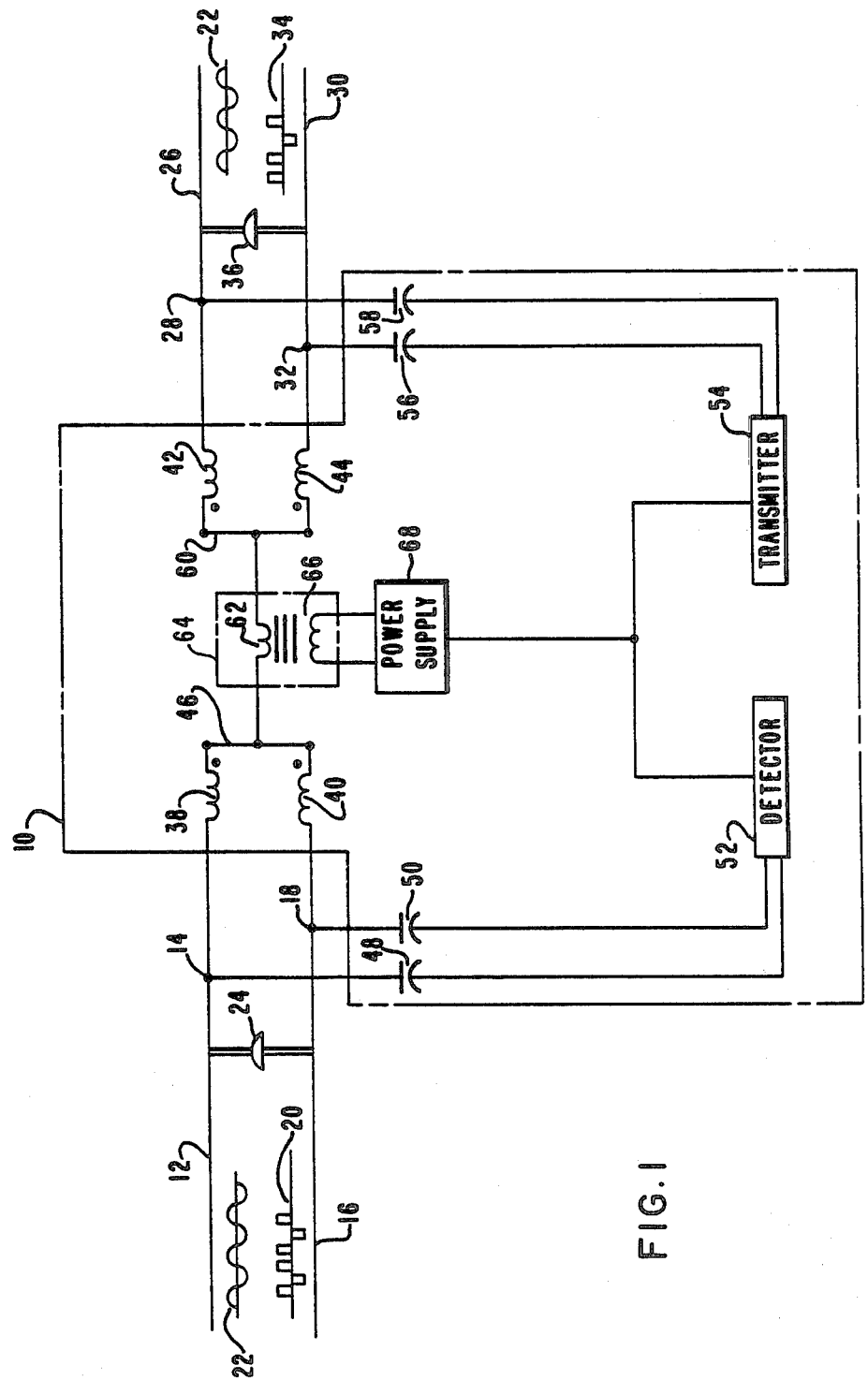
FIG. 1 illustrates connection of the regenerator to the electric power line according to the teachings of the present invention.

Referring to FIG. 1, there is shown a regenerator 10 having a coupling capacitor 48 connected to a bundle conductor 12 at a line terminal 14, and a coupling capacitor 50 connected to a bundle conductor 16 at a line terminal 18. The bundle conductors 12 and 16 constitute a single-phase bundle power-line conductor. The coupling capacitors 48 and 50 receive a data signal 20 propagated over the bundle conductor 12 and the bundle conductor 16 in the differential mode. An electric power signal 22 is propagated over the bundle conductors 12 and 16 in the common mode. The bundle conductor 12 is electrically insulated from the bundle conductor 16 by an insulator 24.

The regenerator 10 may be physically suspended from the same insulator (not shown) which supports and insulates the single-phase bundled power conductor from the grounded transmission-line tower (not shown).

At an output end the regenerator 10 has a coupling capacitor 58 connected to a bundle conductor 26 at a line terminal 28, and a coupling capacitor 56 connected to a bundle conductor 30 at a line terminal 32. The bundled conductors 26 and 30 also constitute a single-phase bundled power-line conductor. A data signal 34, representative of the data signal 20, is coupled to the bundle conductors 26 and 30 at the line terminals 28 and 32 for differential-mode propagation over the bundle conductors 26 and 30. The electric power signal 22 is propagated in the common mode uninterruptedly through the regenerator 10 and over the bundle conductors 26 and 30 as illustrated in FIG. 1. The bundle conductor 26 is separated from the bundle conductor 30 by an insulator 36.

A first terminal of an inductive coil 38 of the regenerator 10 is connected to the bundle conductor 12 at the line terminal 14; a first terminal of an inductive coil 40 is connected to the bundle conductor 16 at the line terminal 18. The inductive coil 38 is magnetically coupled to the inductive coil 40. A second terminal of the inductive coil 38 is connected to a second terminal of the inductive coil 40 via a short circuit 46. The inductive coils 38 and 40 are oriented such that a flux produced by the inductive coil 38 adds to a flux produced by the inductive coil 40 for a differential-mode signal. For a common-mode signal, the flux produced by the inductive coil 38 cancels the flux produced by the inductive coil 40. As a result, the inductive coils 38 and 40 block propagation of the data signal 20 into the short circuit 46 but allow propagation of the electric power signal 22 into the short circuit 46. The data signal 20, but not the electric power signal 22, would therefore be coupled to the regenerator 10 at the line terminals 14 and 18.

The coupling capacitor 48 is connected to a first input terminal of a detector 52 for coupling the data signal 20 from the bundle conductor 12 to the detector 52. Likewise, the coupling capacitor 50 is connected to a second input terminal of the detector 52 for coupling the data signal 20 from the bundle conductor 16 to the detector 52. The detector 52 detects the data signal 20; its operation will be discussed in more detail in conjunction with FIG. 2.

An input terminal of a transmitter 54 is connected to an output terminal of the detector 52. A first output terminal of the transmitter 54 is connected to the line terminal 32 via the coupling capacitor 56; a second output terminal of the transmitter 54 is connected to the line terminal 28 via the coupling capacitor 58. The transmitter 54 produces the data signal 34, which is representative of the data signal 20. The data signal 34 is coupled to the bundle conductors 26 and 30 via the coupling capacitors 56 and 58.

A first terminal of an inductive coil 42 is connected to the line terminal 28; a first terminal of an inductive coil 44 is connected to the line terminal 32. A second terminal of the inductive coil 42 is connected to a second terminal of the inductive coil 44 via a short circuit 60. The inductive coils 42 and 44 function in a manner similar to the inductive coils 38 and 40. The inductive coil 42 is magnetically coupled to the inductive coil 44. Also, the orientation of the inductive coils 42 and 44 causes a flux of the inductive coil 42 to add to a flux of the inductive coil 44 for a differential-mode signal, and to cancel for a common-mode signal. Therefore, the data signal 34 is blocked from propagating into the short circuit 60 by the inductive coils 42 and 44.

A primary coil 62 of a transformer 64 is connected between the short circuit 46 and the short circuit 60. The primary coil 62 completes the path of the electric power signal 22 through the regenerator 10. That is, the electric power signal 22 is propagated from the bundle conductors 12 and 16 through the regenerator 10 via the inductive coils 38 and 40, the short circuit 46, the primary coil 62, the short circuit 60, and the inductive coils 42 and 44. At this point, the electric power signal 22 is coupled to the bundle conductors 26 and 30 at the line terminals 28 and 32. The primary coil 62 is ferromagnetically coupled to a secondary coil 66 of the transformer 64. First and second output terminals of the secondary coil 66 are connected to first and second input terminals, respectively, of a power supply 68. The power supply 68 supplies a power supply voltage for the detector 52 and the transmitter 54; the power supply 68 will be discussed further in conjunction with FIG. 2.

It is important to note that the physical package (not shown) containing the regenerator 10 is energized at the potential of the single-phase bundled power-line conductor comprising bundle conductors 12, 16, 26 and 30. The regenerator 10 may be physically suspended from the same insulator (not shown) which supports and insulates the single-phase bundled power-line conductor from the gounded transmission-line tower (not shown) or other supporting structure (not shown). No electrical connection is made to earth ground or any other phase conductor (not shown) of the power line.

Figure 2:
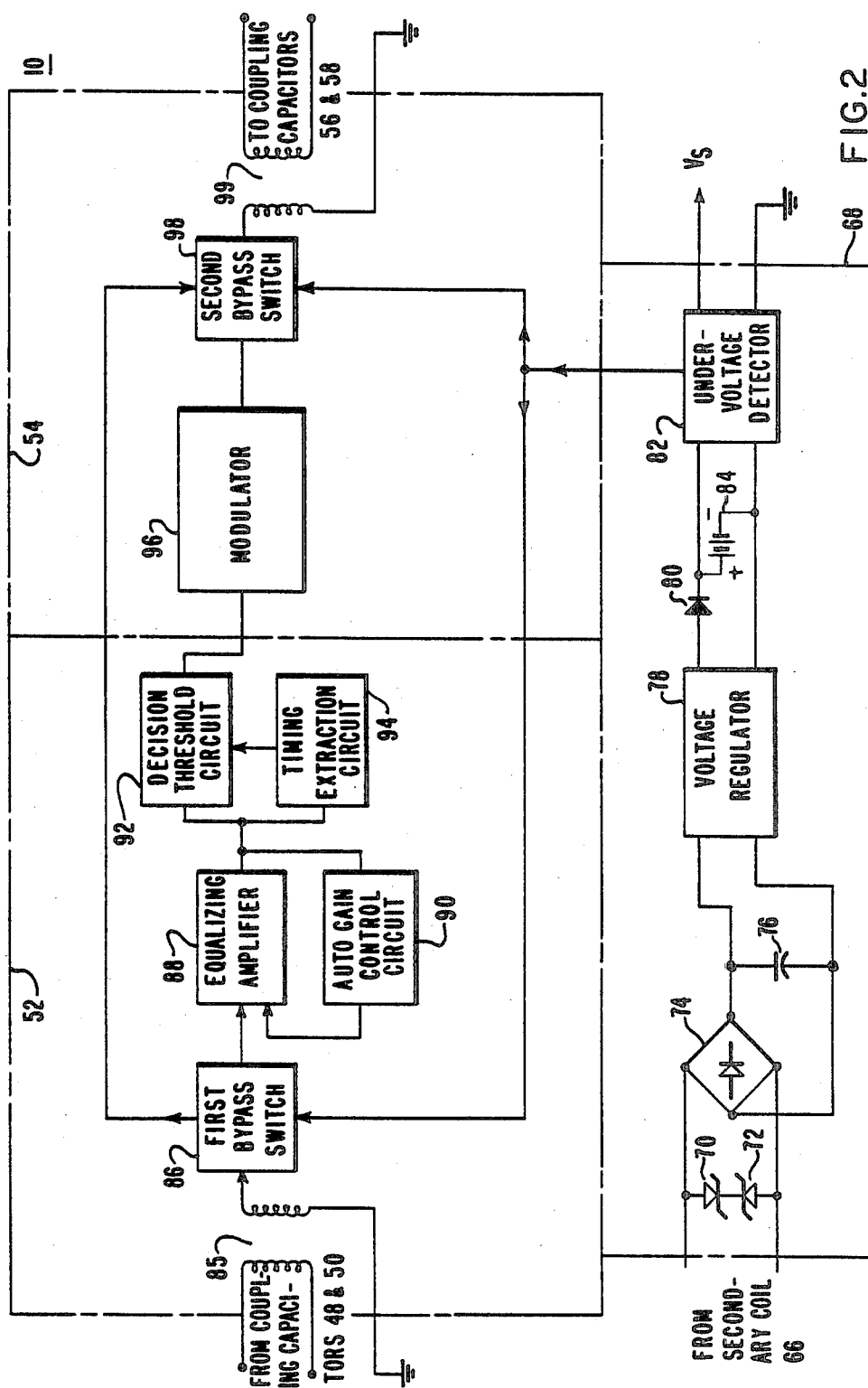
FIG. 2 is a block diagram of the regenerator.

Turning now to FIG. 2, there is shown, primarily in block diagram form, details of the detector 52, the transmitter 54, and the power supply 68. As previously noted, the first input terminal of the power supply 68 is connected to the first output terminal of the secondary coil 66 (not shown on FIG. 2). A second input terminal of the power supply 68 is connected to the second output terminal of the secondary coil 66 (not shown on FIG. 2). A series combination of a Zener diode 70 and a Zener diode 72 is connected across the first and second input terminals of the power supply 68; a cathode terminal of the Zener diode 70 is connected to a cathode terminal of the Zener diode 72. An anode terminal of the Zener diode 70 is connected to a first input terminal of a full-wave bridge rectifier 74. An anode terminal of the Zener diode 72 is connected to a second input terminal of the fullwave bridge rectifier 74. A capacitor 76 is connected across first and second output terminals of the full-wave bridge rectifier 74. The first and the second output terminals of the full-wave bridge rectifier 74 are also connected to first and second input terminals, respectively, of the voltage regulator 78. An anode terminal of a diode 80 is connected to a first output terminal of the voltage regulator 78; a cathode terminal of the diode 80 is connected to a first input terminal of an undervoltage detector 82. A second output terminal of the voltage regulator 78 is connected to a second input terminal of the undervoltage detector 82. A storage battery 84 is connected across the first and second input terminals of the undervoltage detector 82 such that a positive terminal of the battery 84 is connected to the first input terminal of the undervoltage detector 82 and a negative terminal of the storage battery 84 is connected to the second input terminal of the undervoltage detector 82. A power supply voltage for the detector 52 and the transmitter 54, designated $V_s$, is provided at a first output terminal of the undervoltge detector 82; a second output terminal of the undervoltage detector 82 is connected to a regenerator common return circuit.

Current flow in the power line induces a current in the secondary coil 66 of the transformer 64 (not shown in FIG. 2). A saturating core (not shown) of the transformer 64 and the Zener diodes 70 and 72 limit the power supply voltage during heavy power-current flow on the intrabundle conductors 12, 16, 26, and 30. The current from secondary coil 66 is rectified by the full-wave bridge rectifier 74, filtered by the capacitor 76, and regulated by the voltage regulator 78. The battery 84 and the undervoltage detector 82 are both responsive to a regulated voltage produced by the voltage regulator 78. The regulated voltage is applied to the storage battery 84 for recharging the storage battery 84 and also supplies the power supply voltage, $V_s$, for the detector 52 and the transmitter 54 via the undervoltage detector 82. If adequate current flows from secondary coil 66 (not shown in FIG. 2) to the power supply 68, the battery 84 remains charged and operating voltage is supplied from the power-line conductor. Power-line current flow in the primary coil 62 (not shown in FIG. 2) may cease when the power-line operating conditions cause the RMS line current to pass through zero or when the power line is deenergized. Under these circumstances voltage from the voltage regulator 78 may fall below that of the battery 84. This condition reverse biases the diode 80 preventing battery current from flowing through the voltage regulator 78 and allows the battery 84 to supply $V_s$.

The undervoltage detector 82 monitors the magnitude of $V_s$, whether $V_s$ is supplied by the voltage regulator 78 or the battery 84, and provides an undervoltage signal to the detector 52 and the transmitter 54 when $V_s$ drops below a predetermined value. The undervoltage signal causes the data signal 20 to bypass the detector 52 and the transmitter 54. In this mode of operation the data signal 20 is coupled directly from the coupling capacitors 48 and 50 to the coupling capacitors 56 and 58. This scheme permits continuous propagation of the data signal 20 over the intrabundle conductors 12, 16, 28, and 30. Further, since the deenergized power line is free from corona noise, the regenerator 10 is not needed to enhance the signal-to-noise ratio of the data signal 20. Of course, when the detector 52 and the transmitter 54 are bypassed the data signal 34 is identical to the data signal 20.

Continuing with FIG. 2, a first input terminal of a balun 85 is connected to the coupling capacitor 48 (not shown in FIG. 2) and a second input terminal of the balun 85 is connected to the coupling capacitor 50 (not shown in FIG. 2). A first output terminal of the balun 85 is connected to a first input terminal of a first bypass switch 86; a second output terminal of the balun 85 is connected to the regenerator common return circuit. A second input terminal of the first bypass switch 86 is responsive to the undervoltage signal. An input terminal of an equalizing amplifier 88 is connected to a first output terminal of the first bypass switch 86. A first input terminal of a decision threshold circuit 92 and an input terminal of a timing extraction circuit 94 are connected to an output terminal of the equalizing amplifier 88. An input terminal of an automatic gain control circuit 90 is connected to the output terminal of the equalizing amplifier 88; an output terminal of the automatic gain control circuit 90 is connected to a second input terminal of the equalizing amplifier 88. The balun 85, the first bypass switch 86, the equalizing amplifier 88, the automatic gain control circuit 90, the decision threshold circuit 92, and the timing extraction circuit 94 constitute the detector 52.

An input terminal of a modulator 96 is connected to an output terminal of the decision threshold circuit 92; an output terminal of the modulator 96 is connected to a first input terminal of a second bypass switch 98. A second input terminal of the second bypass switch 98 is responsive to the undervoltage signal, and a third input terminal of the second bypass switch 98 is connected to a second output terminal of the first bypass switch 86. A first input terminal of a balun 99 is connected to an output terminal of the second bypass switch 98. A second input terminal of the balun 99 is connected to the regenerator common return circuit. A coupling capacitor 56 is responsive to a first output terminal of the balun 99; a second coupling capacitor 58 is responsive to a second output terminal of the balun 99. The transmitter 54 is comprised of the modulator 96, the second bypass switch 98, and the balun 99.

The detector 52 and the transmitter 54 function as follows. Working in unison, the first bypass switch 86 and the second bypass switch 98 control the signal flow path of the data signal 20 and the data signal 34. When the undervoltage signal is present, the first bypass switch 86, which is responsive to the undervoltage signal, conducts the data signal 20, which is input to the first bypass switch 86 via the balun 85, from the first input terminal of the first bypass switch 86 to the second output terminal thereof. In response to the undervoltage signal, the second bypass switch 98 is responsive to the data signal 20 at the third input terminal thereof. The second bypass switch 98 conducts the data signal 20 to the output terminal of the second bypass switch 98. The coupling capacitors 56 and 58 then couple the data signal 20 to the bundle conductors 26 and 30 via the balun 90. This bypassing action allows the data signal 20 to be communicated from the bundle conductors 12 and 16 to the bundle conductors 26 and 30, bypassing the detector 52 and the transmitter 54 when the battery voltage is below the predetermined value.

When the power supply voltage $V_s$ is sufficient to power the regenerator 10, the undervoltage signal is absent. Now the data signal 20, coupled to the first input terminal of the first bypass switch 86 via the balun 85, is conducted to the first output terminal of the first bypass switch 86 and then to the equalizing amplifier 88. The equalizing amplifier 88 compensates for frequency-dependent attenuation characteristics of the bundle conductors 12 and 16. The automatic gain control circuit 90 in cooperation with the equalizing amplifier 88 controls the gain of the equalizing amplifier 88 such that when the data signal 20 is at a low level the gain of the equalizing amplifier 88 will be increased by the automatic gain control circuit 90, and when the data signal 20 is at a high level the gain of the equalizing amplifier 88 will be decreased. The level of the incoming data signal 20 may vary due to weather-induced changes in attenuation of the power line. Also, other regenerators (or repeaters) similar in design to the regenerator 10 through which the data signal 20 has already passed may either by operating or bypassing the data signal 20. The decision threshold circuit 92 samples the incoming data signal 20 to detect the sequence of received data bits and provides an output signal. The timing extraction circuit 94 extracts timing information from the data signal 20 and provides this timing information to the decision threshold circuit 92 to insure the decision threshold circuit 92 samples the data signal 20 at the proper instant for correct detection of the data signal 20.

The output signal from the decision threshold circuit 92 is input to the modulator 96 which remodulates the output signal and provides the second data signal 34 in response thereto. The second data signal 34 is input to the first input terminal of the second bypass switch 98 and conducted to the output terminal thereof. The second data signal 34 is then conducted to the bundle conductors 26 and 30 via the balun 99.

It is important to note that the coupling capacitors 48, 50, 56 and 58 do not have the power-line phase-to-ground or phase-to-phase potential applied across their respective terminals. Since the only voltage applied across the terminals of each of the coupling capacitors 48, 50, 56, and 58 is the voltage between the bundle conductors 12 and 16 or the bundle conductors 26 and 30, the coupling capacitors 48, 50, 56, and 58 can be of a low-voltage type. This provides a substantially less expensive regenerator than the prior art.

FIGS. 1 and 2 illustrate a preferred embodiment of the present invention wherein the data signal 20 is detected and the data signal 34 is regenerated in response thereto. An alternate embodiment would replace the regenerator with a repeater (not shown). The repeater would simply receive a carrier modulated signal from the bundle conductors 12 and 16 via the balun 85 and the coupling capacitors 48 and 50, amplify it, and recouple the data signal 20 to the bundle conductors 26 and 30 via the balun 99 and the coupling capacitors 56 and 58. The repeater would not provide detection and remodulation, but would utilize the power supply 68. Like the regenerator 10, the repeater would employ the same live-case, line-powered concepts.

What is claimed is:
1. A regenerator being adapted for connection to a power-line conductor wherein a first differential-mode data signal is propagated over said power-line conductor in a direction toward said regenerator and a second differential-mode data signal, representative of said first data signal, is produced by said regenerator and propagated over said power-line conductor in a direction away from said regenerator, and wherein a common-mode electric power signal is uninterruptedly propagated over said power-line conductor, and wherein said power line conductor comprises first and second bundle conductors separated by an insulator, said regenerator comprising:

coupling means being adapted for connection across the first and second bundle conductors at a first location thereof;

detector means connected to said coupling means for receiving said first data signal;

transmitter means for producing said second data signal in response to said detector means;

first inductive coil means having first and second terminals, wherein the first terminal is adapted for connection to the first bundle conductor at the first location;

second inductive coil means having first and second terminals, wherein the first terminal is adapted for connection to the second bundle conductor at the first location, and the second terminal is connected to the second terminal of the first inductive coil such that said first and second inductive coil means are in series with the first and second bundle conductors respectively, at the second location;

wherein said first inductive coil means is inductively coupled to said second inductive coil means such that the mutual inductance is negative for the first data signal and positive for the electric power signal, to prevent said first data signal from propagating beyond the first location and to allow said electric power signal to propagate beyond the first location;

and electrical trap means being adapted for connection to said power-line conductor at said second location thereof, wherein said electrical trap means is responsive to said first and second inductive coil means at a first terminal thereof, and responsive to said second data signal at a second terminal thereof, said electrical trap means for coupling said second data signal to said power-line conductor at said second location, for directing propagation of said second data signal away from said regenerator, and for directing propagation of said electric power signal away from said regenerator.

2. The regenerator of claim 1 wherein a power supply voltage for the detector means and the transmitter means is produced by means responsive to the electric power signal.

3. The regenerator of claim 1 wherein the first coupling means includes a first capacitor being adapted for connection to the first bundle conductor at the first location and a second capacitor being adapted for connection to the second bundle conductor at the first location, wherein said first and said second capacitors cooperate to couple the first data signal from the power-line conductor at the first location thereof to the detector means.

4. The regenerator of claim 1 including:
transformer means having primary and secondary coils, said primary coil disposed between the second terminals of the first and second inductive coil means and the electrical trap means, such that the electric power signal flows through said transformer means;
and power supply means responsive to said secondary coil of said transformer means providing a power supply voltage to the detector means and the transmitter means.

5. The regenerator of claim 4 wherein the transformer means is a saturating current transformer.

6. The regenerator of claim 4 wherein the power supply means includes electrical storage means for providing the power supply voltage when the power-line conductor is deenergized.

7. The regenerator of claim 6 wherein the electrical storage means includes storage battery means.

8. The regenerator of claim 7 wherein the power supply means includes charging means for recharging the electrical storage means when the power-line conductor is energized.

9. The regenerator of claim 4 wherein the power supply means includes detector means for determining the adequacy of the voltage produced by the power supply means.

10. The regenerator of claim 9 wherein the power supply means includes undervoltage detector means responsive to the power supply voltage for determining when the power supply voltage is below a predetermined value and for providing an undervoltage signal in response thereto.

11. The regenerator of claim 10 including first bypass switch means being adapted for disposition between the coupling means and the detector means, whereby said first bypass switch means is responsive to the first data signal, said first bypass switch means also responsive to the undervoltage signal, wherein the detector means is selectively responsive to the first data signal when the undervoltage signal is not present, and wherein the power-line conductor at the second location is selectively responsive to the first data signal when the undervoltage signal is present, whereby when the power supply voltage is below the predetermined value the first data signal is coupled directly to the power-line conductor at the second location thereby bypassing the detector means and the transmitter means.

12. The regenerator of claim 11 including second bypass switch means being adapted for disposition between the electrical trap means and the transmitter means, said second bypass switch means responsive to the undervoltage signal, wherein said second bypass switch means is selectively responsive to the transmitter means when the undervoltage signal is not present, and selectively responsive to the first bypass switch means when the undervoltage signal is present, whereby when the power supply voltage is below the predetermined value the first data signal is coupled directly to the power-line conductor at the second location, thereby bypassing the detector means and the transmitter means.

13. The regenerator of claim 1 wherein the second coupling means includes a first capacitor being adapted for connection to the first bundle conductor at the second location, and a second capacitor being adapted for connection to the second bundle conductor at the second location, wherein said first and said second capacitors cooperate to couple the second data signal from the transmitter means to the first and the second bundle conductors at the second location.

14. The regenerator of claim 1 wherein the detector means includes:
equalizing amplifier means for providing a frequency-equalized signal in response to the first data signal;
decision-threshold means for providing a decoded signal in response to said frequency-equalized signal, wherein the transmitter means is responsive to said decoded signal.

15. The regenerator of claim 14 wherein a gain of the equalizing amplifier means is dependent on frequency such that said equalizing amplifier means compensates for frequency attenuation characteristics of the power-line conductor.

16. The regenerator of claim 14 wherein the equalizing amplifier means includes an automatic gain control circuit for controlling the gain of said equalizing amplifier means dependent on the magnitude of the first data signal.

17. A regenerator being adapted for connection to a power-line conductor wherein a first differential-mode data signal is propagated over said power-line conductor in a direction toward said regenerator and a second differential-mode data signal, representative of said first data signal, is produced by said regenerator and propagated over said power-line conductor in a direction away from said regenerator, and wherein a common-mode electric power signal is uninterruptedly propagated over said power-line conductor, and wherein said power line conductor comprises first and second bundle conductors separated by an insulator, said regenerator comprising:
  electrical trap means being adapted for connection to said power-line conductor at said first location, said electrical trap means responsive to said first data signal for preventing propagation of said first data signal beyond said first electrical trap means, and for allowing propagation of said electric power signal beyond said first electrical trap means;
  detector means responsive to said first data signal via said electrical trap means;
  wherein said electrical trap means prevents propagation of said electric power signal into said detector means;
  transmitter means for producing said second data signal in response to said detector means;
  coupling means being adapted for connection across the first and second bundle conductors at said second location, wherein said coupling means is responsive to said second data signal for injecting said second data signal onto the first and second bundle conductors at said second location;
  first inductive coil means having first and second terminals wherein the first terminal is adapted for connection to the first bundle conductor at said second location;
  second inductive coil means having first and second terminals, wherein the first terminal is adapted for connection to the second bundle conductor at said second location, and the second terminal is connected to the second terminal of the first inductive coil means, such that said first and second inductive coil means are in series with the first and second bundle conductors, respectively, at said second location, and wherein the second terminals of said first and second inductive coil means are connected to said electrical trap means;
  wherein said first inductive coil means is inductively coupled to said second inductive coil means such that the mutual inductance is negative for the second data signal and positive for the electric power signal, to allow said second data signal and said electric power signal to propagate away from said regenerator.

18. A repeater being adapted for connection to a power-line conductor wherein a differential-mode data signal is propagated over said power-line conductor, and wherein a common-mode electric power signal is propagated over said power-line conductor, and wherein said power-line conductor comprises first and second bundle conductors separated by an insulator, said repeater comprising:
  first coupling means being adapted for connection across the first and second bundle conductors at a first location thereof, wherein said first coupling means is responsive to said data signal;
  amplifier means responsive to said data signal via said coupling means; said amplifier means being adapted to receive and process said data signal;
  first inductive coil means having first and second terminals, wherein the first terminal is adapted for connection to the first bundle conductor at said first location;
  second inductive coil means having first and second terminals, wherein the first terminal is adapted for connection to the second bundle conductor at said first location and the second terminal is connected to the second terminal of the first inductive coil, such that said first and second inductive coil means are in series with the first and second bundle conductors, respectively, at said first location;
  wherein said first inductive coil means is inductively coupled to said second inductive coil means such that the mutual inductance is negative for the data signal and positive for the electric power signal, to prevent said data signal from propagating beyond said first location and to allow said electric power signal to propagate beyond said first location;
  second coupling means being adapted for connection across the first and second bundle conductors at a second location thereof, wherein said second coupling means is connected to said amplifier means for reinjecting said data signal onto the first and second bundle conductors at said second location thereof;
  third inductive coil means having first and second terminals, wherein the first terminal is adapted for connection to the first bundle conductor at said second location;
  and fourth inductive coil means having first and second terminals, wherein the first terminal is adapted for connection to the second bundle conductor at said second location, and the second terminal is connected to the second terminal of the third inductive coil means, such that said third and fourth inductive coil means are in series with the first and second bundle conductors, respectively, at said second location, and wherein the second terminals of said third and fourth inductive coil means are connected to the second terminals of the first and second inductive coil means;
  wherein said third inductive coil means is inductively coupled to said fourth inductive coil means such that the mutual inductance is negative for said data signal and positive for said electric power signal, to allow said data signal and said electric power signal to propagate away from said repeater.

19. A regenerator being adapted for connection to a power-line conductor wherein a first differential-mode data signal is propagated over said power-line conductor in a direction toward said regenerator and a second differential-mode data signal, representative of said first data signal, is produced by said regenerator and propagated over said power-line conductor in a direction away from said regenerator, and wherein a common-mode electric power signal is uninterruptedly propagated over said power-line conductor, and wherein said power line conductor comprises first and second bundle conductors separated by an insulator, said regenerator comprising:

first coupling means including a first capacitor being adapted for connection to said first bundle conductor at a first location thereof, and including a second capacitor being adapted for connection to said second bundle conductor at said first location, whereby said first and said second capacitors of said first coupling means cooperate to receive said first data signal;

detector means responsive to said first coupling means for producing a third signal in response thereto;

transmitter means responsive to said third signal for producing said second data signal in response thereto;

first electrical trap means including first inductive coil means having first and second terminals, wherein the first terminal is adapted for connection to said first bundle conductor at said first location, and including second inductive coil means having first and second terminals, wherein the first terminal is adapted for connection to said second bundle conductor at said first location wherein the second terminal of said first inductive coil means is connected to the second terminal of said second inductive coil means, such that said first and second inductive coil means are in series with the first and second bundle conductors, respectively, at said first location, and wherein said first inductive coil means of said first electrical trap means is inductively coupled to said second inductive coil means of said first electrical trap means such that a mutual inductance of said first electrical trap means is negative for the first data signal and positive for the electric power signal, said first electrical trap means for preventing propagation of said first data signal beyond said first electrical trap means, for allowing propagation of said electric power signal beyond said first electrical trap means, and for preventing propagation of said electric power signal into said detector means;

transformer means including a primary coil having first and second terminals, and a secondary coil, wherein said first terminal is connected to the second terminals of said first and second inductive coil means;

power supply means responsive to said secondary coil of said transformer means for providing a power supply voltage to said detector means and said transmitter means;

second coupling means responsive to said transmitter means, said second coupling means including a first capacitor being adapted for connection to said first bundle conductor at a second location thereof, and including a second capacitor being adapted for connection to said second bundle conductor at said second location, whereby said first and said second capacitors of said second coupling means cooperate to couple said second data signal to said power-line conductor at said second location;

and second electrical trap means including first inductive coil means having first and second terminals, wherein the first terminal is adapted for connection to said first bundle conductor at said second location, and including second inductive coil means having first and second terminals, wherein the first terminal is adapted for connection to said second bundle conductor at said second location, wherein the second terminal of said first inductive coil means is connected to the second terminal of said second inductive coil means, such that said first and second inductive coil means are in series with the first and second bundle conductors, respectively, at said second location and wherein said first inductive coil means of said second electrical trap means is inductively coupled to said second inductive coil means of said second electrical trap means such that a mutual inductance of said second electrical trap means is negative for the second data signal and positive for the electric power signal, said second electrical trap means for directing propagation of said second data signal away from said regenerator, and for directing propagation of said electric power signal away from said regenerator.

* * * * *